UNITED STATES PATENT OFFICE.

MICHAEL A. POPKESS, OF KANSAS CITY, MISSOURI, ASSIGNOR TO BITUMINIZED ROAD COMPANY, A CORPORATION OF ARIZONA.

MANUFACTURE OF PLASTICS.

1,240,252.  
Specification of Letters Patent.  
Patented Sept. 18, 1917.

No Drawing. Application filed April 11, 1916. Serial No. 90,391.

*To all whom it may concern:*

Be it known that I, MICHAEL A. POPKESS, a citizen of the United States, residing at Kansas City, in the county of Jackson and State of Missouri, have invented new and useful Improvements in Manufacture of Plastics, of which the following is a specification.

This invention relates to the manufacture of plastics; and it comprises a method of manufacturing plastic materials wherein clayey material, or earth containing clay, in its natural or deflocculated, plastic and moist condition is impregnated with bituminous material under conditions avoiding destruction of the plasticity, such bituminous material being used in about the amount necessary to displace the moisture necessary for plasticity without substantial excess above said amount, as in taking moist or wet clay, plastic clay, or earthy material comprising clay, and incorporating a modicum of liquid asphalt therein, the two materials being worked together until the liquid asphalt displaces the moisture and air, no opportunity being afforded for "flocculation" or change in the physical nature of the ultimate clay particles or their relation to each other; and it also comprises as a new composition of matter material composed of or comprising a stabilized clay having the main characteristics and composition of natural moist deflocculated plastic clay but differing therefrom by the substitution of asphalt or other bituminous matter for the water of plasticity of such natural clay; such material being hard but malleable and plastic, not altering materially with temperature changes, and in most embodiments being dense and poreless; all as more fully hereinafter set forth and as claimed.

Clay is a component of all natural soils except pure sands; and forms a large part of the earthy matter of most of them. Typical agricultural soils will run from 25 to 30 per cent of clay (as dry material) up. The clay substance is usually largely composed of hydrated silicates of alumina ("kaolin") and exists as very minute particles, these particles in large part having sizes from, say, a micron (one ten-thousandth centimeter or one twenty-five-thousandth inch) in thickness by about 3 microns in length down to even smaller dimensions. Because of their excessive minuteness these particles have many of the properties known as colloidal. In the natural moist clayey soil, these particles in conjunction with the water present, (provided the amount of this water is within certain limits) give the whole mass pronouncedly colloid characteristics; and the mass is plastic. With the proper amount of water, it may be molded like wax. Just what the action of the water on the clay particles is, or how it is associated with them, is not known. For the sake of a name, the water in the condition in which it, at least mostly, exists in plastic clay is known as "adsorbed" water. It may well be that each of the fine particles is united to and spaced from its neighbors by intervening films of water of microscopic, or ultramicroscopic thinness, possessing the well known mechanical strength of thin films but allowing a limited degree of particle movement, thereby giving plasticity; or it may be that the relation of moisture and clay particles is much more complex. The theories are many and conflicting; and I content myself with noting facts. With the right amount of water, clay, though plastic, may have a high degree of stiffness and mechanical strength. Such clay, as in a good "dirt" road in good condition, is stiff and strong enough to withstand heavy traffic. With less water or more water, its mechanical strength diminishes. With ordinary plastic clay, a ball containing about 20 per cent. of moisture will hold its shape well; but there is an excess of moisture which may be squeezed out. It has a little too much water for the greatest strength. With amounts of water between 18 and 20 per cent., with many clays the greatest strength is reached.

Considering natural clay, it is evident that if the amount of moisture could be kept permanently at the right point, a material useful for a multiplicity of purposes could be made. But changes cannot well be restrained because of evaporation; and, where exposed to the air, because of the wetting of the clay by the rain.

In the present invention I provide a permanent and stable material closely analogous in properties and constitution to the described plastic natural clay, substituting for the adsorbed water however a colloid material also having the power of imparting plasticity to, or retaining it in, the clay particles; the substitution being effected in such a way as to change such particles or their mutual relation, as little as possible. In the present embodiment of my invention the material so substituted is asphalt or like bituminous matter, and I use such material in about the amount equivalent to the amount of water necessary to render the same clay, or earth, plastic. In so treating clay I produce a material which, like natural clay, is homogeneous, or practically homogeneous under the microscope, showing no segregated portions or layers, and which, again like clay, is plastic; such material differing in both respects from the usual asphalt compositions containing a coarse mineral aggregate, such as sand or gravel, cemented by layers of asphalt and having voids filled with asphalt. The present material is plastic, unlike the usual asphalt compositions in which the non-asphaltic material is usually, as far as possible, in locked engagement; that is the whole assemblage is as rigid as possible.

Natural clay is, as stated, largely composed of hydrated minerals; it contains water of combination or of constitution, and when this water of constitution is driven out it no longer has the properties of plastic clay. This water of constitution is tolerably permanent and does not leave the clay at the temperature of boiling water, 212° F., or a little above, although such a temperature is sufficient to remove all the water present physically as moisture. When a clay is dried, even without loss of water of constitution, its particles are brought into another relation with regard to each other than that which exists in the natural moist clay. The clay particles are still clay but their relation to each other is different from that which exists in the natural plastic material. The orginal relation however may be reëstablished by moistening the dry clay. But when the heat is carried further so as to drive out the water of combination the particles are no longer clay; they are baked clay which is something different and does not again become plastic with water.

In the present invention I take moist clay and substitute more or less gradually liquid asphalt or the like for the physical water present so as to secure the presence of the asphale in the material in the same relation as the water was originally; that is, the asphalt assumes the same relation to excessively fine particles of clay substance that the water had.

In the present embodiment of my invention I employ asphaltic materials which are more or less solid at ordinary temperatures and in the incorporation of the asphalt into the clayey material I raise the temperature to a point where the asphalt is freely liquid so that it may enter the clay and displace the water as one liquid displaces another, and then afterward cool to harden the asphalt. This is for the reason that in this embodiment of my invention I aim to secure a material which is like the dense plastic natural clay already described with the optimum amount of water but is somewhat stronger. Therefore I liquefy the asphalt until incorporation is secured and then drop the temperature, whereby the asphalt becomes hardened and the mechanical strength of the material concomitantly increased. The final material however is analogous to the original clay save that iu the place of liquid water in association with the particles I have substituted solidified asphalt. The new material is plastic, that is it will yield in the same way as the original dense clay, save that it takes more pressure to deform it. The difference in yielding is a difference in degree and not in kind; the new material is what I may call a stabilized clay, although it is stiffer and stronger than the original clay even with the best proportion of water therein. But like the original clay it is a malleable material.

Normally solid asphalts and like bitumens can mostly be rendered liquid enough for the present purposes at temperatures below the boiling point of water, 212° F. And I therefore bring the asphalt into contact with the wet or moist soil at a temperature below 212°, say around 120° to 160° F. and incorporate. In incorporation, rather energetic stirring, kneading, maceration, or agitation is desirable. Either the earth or the asphalt may be preheated to bring the assemblage to the right temperature, or heating may be simultaneous with agitation. In agitation the mixture should be well disintegrated to hasten and facilitate incorporation; and it is well to disintegrate or comminute the earthy material before incorporating with the asphalt. In incorporating at 120° to 160° F. I ordinarily continue agitation and disintegration till the mixture is substantially homogeneous, and then raise the temperature to 212° or somewhat over, incorporation being continued. This expels the remainder of the water and gives a dry product. In the present specific embodiment of my invention I aim to secure a product which is substantially dry; that is, contains no moisture. The clay particles of course still contain their water of hydration and this I do not remove.

If not originally sufficiently wet or moist the earthy material may be wetted or steamed. The earthy material should always contain, at the time of incorporation, at least enough water to render it moist, whether this water be that naturally present or is artificially added. There may be much more water present but there should always be at least enough to make the earthy material moist. The presence of moisture is necessary, as in the deflocculated soils found in nature, to maintain the deflocculated state. Ordinary earthy material as it occurs in nature contains from 5 to 30 per cent. of moisture. With the latter amount, the mixture is more than merely plastic, being wet or muddy. The presence of an excess of moisture over the amount required for more plasticity is often convenient as increasing the ease of working; the two liquids (asphalt and water) coöperating in giving fluency or fluidity to the mixture. In dry weather it is often necessary to add water to obtain the consistency found in wet weather. The use of powerful disintegrating and agitating means is desirable.

Any convenient apparatus may be used in performing the incorporation.

In steaming, it is ordinarily not convenient in road making operations to treat the clay in a container filled with steam; that is to subject it to the action of flowing steam. This may be done however; it is merely not often convenient in the practice of road making where the apparatus used is a traveling one. The same result of securing steam in the presence of the earthy material is obtained where damp or wet material is heated, since this results in the formation of water vapor. The water vapor or steam displaces the air present and materially aids thereby in incorporation. In such an operation, the steam evolved in the heating displaces the air and the liquid water in the material may be converted into steam as fast as it is displaced by the bitumen; in effect, the bitumen is thus substituted for liquid water as fast as the latter is converted into water vapor, that is steam. In preliminarily disintegrating soil to convert it into the very fine material desired in the present invention, the soil may be converted into a very fine condition. But if it is not a dry dust (in which event it must be subsequently moistened) it still contains adsorbed moisture. In warming up and disintegrating the soil this adsorbed moisture is converted, or partially converted, into vapor, which aids in the operation.

The point in the embodiment of my invention as hereinafter specifically claimed is the replacement of the water by liquid asphalt in a progressive way, so that the asphalt may enter and ultimately have the same relation to the clay material that the water originally had. Where the clay is too dry originally, it may be treated with water, either as liquid or as steam. Where it is too damp it may be somewhat dried. It is usually desirable to warm the clay prior to the incorporation in order to avoid chilling the bitumen.

Where the present process is applied to moist plastic clays very useful materials for many purposes are secured. These compositions may of course be mixed with the ordinary fillers found in plastics. The hardened clay also forms a useful road material. Instead of using clay alone, I may take natural soils. Most natural soils contain in addition to the clay many other things, ranging from particles of silica (sand) up through gravel to even coarser stuff, such as stones. So long as clay is present, these other bodies, in the proportions ordinarily found in nature, do not interfere with the present process for many purposes; and in road making they may even be advantageous. Soils usually contain more or less organic matter and this for many purposes does no harm. The organic matters in soil assist in the deflocculation of clay, that is they render it more plastic; and for the present purposes the more moist or wet the clay the better. In the final product, since it is dry and dense, for most purposes the presence of the organic matter does no harm whatsoever.

In practical embodiments of the present invention I may take a natural soil containing a sufficient amount of moisture to make it moist or wet and heat it to about 120–160° F. and work in bitumen at the same temperature. This bitumen may be any of the ordinary kinds of asphalt liquid at this temperature. The incorporation may be effected by any type of stirring, agitating or disintegrating apparatus. After incorporation at 120° to 160° F. has gone on for a sufficient period of time, the temperature is raised to 212° or slightly above to drive off any residual free moisture without interfering materially with the combined water of the clay. The material is now a plastic clay-like mass, and on cooling, it retains this plastic clay-like nature but is of course considerably harder and stiffer than the clay or soil from which it was made. For the sake of convenience, after the incorporation proper, I may disintegrate in order to produce a more subdivided material convenient for application, as for instance in making a road. This re-disintegration makes the material of more convenient physical form and also breaks any small balls or lumps of mixed material which may have formed.

For road making purposes the presence of sand or gravel in the earthy material in the proportions ordinarily found in natural soils does not injuriously affect the results of the process. So long as there is sufficient natural clay present the objects of my invention are effected.

As just described, I have stated the use of a normally solid or semi-solid bitumen, such as asphalt—something which will become liquid at a convenient temperature for incorporation but will become harder on cooling to ordinary temperatures. However naturally liquid asphalt may be used in the operation performed at ordinary temperatures, the liquid asphalt displacing the liquid water. In so doing a material more analogous to natural clay is secured, but while the liquid water present in the clay is displaced in its relation to the particles of the material, it still remains in the composition. It will however dry out on exposure to air. The material so produced, however, is because of this presence of moisture much more porous than the dense practically poreless material made as just described. For road making purposes the wet mixture may be spread on the roadway and allowed to dry by the heat of the sun. As the water disappears by evaporation the mass becomes porous, but it will soon become compacted. In rainy districts, however, this drying out by the heat of the sun on the roadway is not always practicable. For road making purposes therefore I prefer an artificial drying, even where using the naturally liquid asphalts. Naturally liquid asphalts when exposed to the air in the porous condition of the material made as just described tend to taken up oxygen and become harder.

I have found that in making earth pavements containing the usual amounts of clay thoroughly waterproof and of a maximum strength and malleability it is usually desirable to employ about 14 to 22 per cent. of asphalt by weight.

In another and prior patent I have described and claimed the production of a paving material which also consists essentially of earth or clay thoroughly permeated by bitumen, this patent being numbered 1,008,433. In said prior patent, however, I first dry out the material and heat it to some extent, so that, in the final material, the clay exists in a more or less flocculated condition; that is, the relations of the particles to each other and to the binder are not the same as existed in the original clay between the particles and the water present. In the present invention I retain the water in the material until I have effected the incorporation of the bitumen, thereby securing the same relation between the bitumen and the particles which existed in the original clay between the particles and the water.

In paving under the present invention I may take ordinary moist soil containing a substantial amount of clay, warm it to, say, 120 to 160° F. and mingle it with 14 to 22 per cent. by weight of ordinary asphalt, which may be any of the ordinary types. If the asphalt contains earthy matter somewhat more of it should be used. About 20 per cent. of asphalt is a good amount for most ordinary soils. If the soil is not sufficiently moist, it should be moistened. In heating, the operation should be so conducted as not to produce any great amount of drying. Heating of the soil may be before or during the mixing. How it is done is not important so long as the mixture during the incorporation is at the proper temperature to cause the asphalt to enter the material in the way described. The soil may or may not be submitted to a preliminary disintegration prior to contacting with the asphalt; but ordinarily, and particularly with moist soils, it is more convenient to disintegrate it at least somewhat prior to mixing. The asphalt may be preliminarily liquefied prior to contact, or liquefaction may take place during the contacting and mixing. It is best usually to melt the asphalt first as it shortens the time of incorporation. After incorporation and substantial homogeneity of the material is produced, the temperature is then raised to about 212°, or perhaps a few degrees above, and agitation continued. This permits extrication of any remaining moisture. At this stage the material varies in its consistency according to the character of the original soil and to some extent according to the amount of asphalt added. With an ordinary soil and about 20 per cent. of asphalt the mixed material may be somewhat fluffy but will be dry in appearance. On cooling it becomes harder and harder until finally at ordinary temperatures, with a "high penetration asphalt" it is rather like a hard rubber which has not been vulcanized too far. It will yield and deform under high pressure, being what may be termed malleable. In the road it does not yield except to the heaviest traffic, and depressions which may form are self-healing. It does not yield in the sense of forming waves or undulations. The mineral matter not being in the form of the usual aggregate, in which the several portions are in locked engagement, deformation and restoration of shape are possible. I ordinarily disintegrate the material while still hot and then spread it on the road in this disintegrated form.

In the case of rather had asphalts, disintegration and some of the mixing of both the soil and asphalt may be prior to the heating operation. In the case of normally liquid asphalts incorporation and mixing may be prior to any heating; and heating may even be dispensed with. But even with normally liquid asphalts I ordinarily heat at the end of the operation to remove moisture for reasons hereinbefore set forth.

The final disintegration of the incorporated material is very convenient in paving, since it allows the material to be readily and evenly spread upon the surface to be paved. Disintegration may be carried as far as may be desired.

Where the material is redisintegrated after completion of the incorporation operation, it is of course again compacted to produce the final materials, whether this be a road or another article.

Where an asphalt of exceptionally high melting point is used, it may be heated to the desired point and then mingled with the soil, producing an average temperature which is not dangerous. Cold soil may of course be mixed with very hot asphalt to produce an average temperature which is suitable for the present purposes. Or, as stated, disintegrated asphalt in a pulverulent condition may be mixed with disintegrated moist soil in a pulverulent condition, both being in an unheated state and then the mixture heated for incorporation and removal of the moisture, the materials being further disintegrated during incorporation.

For special purposes, the material may be finally heated to temperatures materially above 212° F.

The present material when shaped into form is substantially poreless and free of voids for the reason that because of its plasticity any voids or pores will become obliterated in compacting it. There is no local accumulation of asphalt occurring in and filling voids, as in the ordinary asphalt compositions. The amount of asphalt in the best embodiment of this invention being merely that which will be taken up by the clay material, the resultant composition is not sticky; it displays no tendency to part with its asphalt to other materials. For this reason, roads made with it do not tend to pick up a surface layer of adhering dirt; they are kept clean by travel and rain.

The material exhibits very little change under ordinary atmospheric temperature changes, even when these changes are extreme, still retaining its rubbery malleable properties at low temperatures and showing no tendency to flow or run at high temperatures. Exposure of the material to heat does not separate the asphalt and the clay. The clay-bitumen mass being composed of the colloidal clay particles and asphalt, which is itself colloid, the new composition has the well known properties of colloid materials. It will not, of course, grind into dust or separate by mechanical action. Even with a soft asphalt, the composition is hard. In a roadway it withstands the heaviest traffic.

What I claim is:—

1. The process of forming a material suitable for paving purposes and the like, which consists in heating damp earthy material in a deflocculated condition in the presence of a liquid bitumen to drive off the moisture, and simultaneously disintegrating and mixing the material with bitumen while so heated, whereby the bitumen penetrates the earthy material as the moisture leaves it, and maintains it in its deflocculated condition.

2. The process of forming a material suitable for paving purposes and the like, which consists in mixing moist finely divided earthy material containing substances having plasticity and colloidal qualities with a liquid bitumen, heating the mixture to drive off the moisture, and vigorously agitating it to assist the bitumen to impregnate the material.

3. The process of forming a material suitable for paving purposes and the like, which consists in warming moist earthy material, adding a liquid bitumen thereto, and simultaneously mixing and disintegrating the mixture.

4. The process of forming a material suitable for paving purposes and the like, which consists in warming earthy moist material, adding a liquid bitumen thereto, simultaneously mixing and disintegrating the mixture, and heating the same to drive off the moisture.

5. The process of forming a material suitable for paving purposes and the like, which comprises heating moist ordinary earthy material at a temperature which is below 212° F. but is sufficient to vaporize part of the moisture, and while so heated adding liquid bitumen thereto and simultaneously stirring to thoroughly mix and disintegrate the earth and the bitumen, and finally raising the heat to a degree somewhat in excess of 212° F.

6. The process of forming a material suitable for paving purposes and the like, which consists in comminuting ordinary earthy material in the presence of heat sufficient to only drive off part of the free moisture contained therein, adding a liquefied bituminous binder, and thoroughly mixing the same in the presence of heat sufficient to drive off the rest of the moisture.

7. The process of forming a material suitable for paving purposes and the like which consists in subjecting ordinary moist earthy material to a comminuting operation while warm, adding thereto a liquefied bitumen, thoroughly mixing the same while hot, heating to drive off residual moisture, disintegrating the mixture, and finally compacting the same.

8. The process of forming a material suitable for paving purposes and the like, which consists in simultaneously heating, disintegrating and mixing with bitumen, ordinary moist earthy material and continuing the agitation while heating to a higher temperature to remove residual moisture and produce a more or less disintegrated final product.

9. The process of forming a paving material which comprises taking moist clayey earth, mixing it with a liquid asphalt, subjecting the mixture to a thorough disintegration, and heating it to drive off moisture.

10. The process of making plastic materials which comprises incorporating liquid bituminous matter with earthy material containing its clayey particles in their natural state and also containing at least enough water to render such material moist till such bituminous matter replaces the plasticizing moisture present, the amount of such bituminous matter being merely that which will suffice to replace such moisture and give a hard, firm and dense composition.

11. The process of making plastic materials which comprises incorporating a normally solid bituminous matter at a temperature sufficient to liquefy it with earthy material containing its clayey particles in their natural state and also containing at least enough water to render such material moist and continuing the incorporation at a temperature below 212° F. till such bituminous matter replaces the plasticizing moisture present, the amount of such bituminous matter being merely that which will suffice to replace such moisture and give a hard, firm and dense composition.

12. The process of making plastic materials which comprises mixing liquid asphalt with a natural clayey material containing sufficient adsorbed water to render it plastic, such mixing being at a temperature below 212° and continued long enough to replace such water by such asphalt, and the amount of asphalt being merely such as will produce a hard and firm product.

13. The process of making plastic materials which comprises liquefying asphalt by heat and mixing it with a natural clayey material containing sufficient adsorbed water to render it plastic, such mixing being at a temperature below 212° and continued long enough to replace such water by such asphalt, and the amount of asphalt being merely such as will produce a hard and firm product.

14. The process of making plastic materials which comprises liquefying asphalt by heat and mixing it with a natural clayey material containing sufficient adsorbed water to render it plastic, such mixing being at a temperature below 212°, being continued long enough to replace such water by such asphalt, and the amount of asphalt being merely such as will produce on cooling a hard, dense and firm product, the heat being finally raised to about 212° to expel residual water and the mass being then cooled.

15. The process of making plastic materials which comprises liquefying asphalt by heat and mixing it with a natural clayey material containing sufficient adsorbed water to render it plastic, such kneading being at a temperature below 212° and continued long enough to replace such water by such asphalt, and the amount of asphalt being merely such as will produce on cooling a hard, dense and firm product, the heat being finally raised to about 212° to expel residual water and the mass being then disintegrated and cooled.

16. The process of making plastic materials which comprises adding a liquefied bituminous binder to a finely disintegrated moist earthy material, incorporating the binder and material and then removing the free moisture.

17. The process of making plastic materials which comprises incorporating liquid bituminous matter with moist warm finely disintegrated earthy material and finally heating the mixture to at least 212° F. to drive off free moisture.

18. The process of making plastic materials which comprises simultaneously finely disintegrating and incorporating a liquid bituminous binder and moist earthy material and thereafter drying the mixture.

19. The process of making plastic materials which comprises incorporating a liquid bituminous binder with moist very finely subdivided warm earthy material, said earthy material being at a temperature below 212° F., continuing the incorporation until a substantially homogeneous mixture is produced and finally raising the temperature of the mixed material to at least 212° F. to eliminate substantially all free moisture.

20. The process of forming a paving material which comprises incorporating and disintegrating together moist earthy material with bitumen at a temperature sufficient to convert some or all of the moisture into water vapor and to render said bitumen freely liquid, incorporation being continued until the bitumen enters the earthy material and takes the place of the original moisture, the amount of such bitumen being such as will make the whole finished composition, upon cooling, hard, dense and stiff.

21. The process of forming a paving material which comprises incorporating and disintegrating together moist, finely disintegrated material with bitumen at a temperature sufficient to convert some or all of the moisture into water vapor and to render said bitumen freely liquid, incorporation being continued until the bitumen enters the earthy material and takes the place of the original moisture, the amount of such bitumen being such as will make the whole finished composition upon cooling, hard, dense and stiff.

22. The process of forming a paving material which comprises incorporating together warm moist earthy material and bitumen in the presence of water vapor, the incorporation being performed in such manner as to disintegrate the materials during incorporation, and the incorporation being continued until the bitumen thoroughly permeates said earthy material to produce a substantially homogeneous composition which upon cooling will become hard, dense and stiff.

23. The process of forming a paving material which comprises admixing warm moist, very finely disintegrated earthy material with bitumen, the mixture being heated during incorporation to vaporize and expel the moisture and the incorporation being continued until a substantially homogeneous composition as regards bitumen and earthy matter is produced.

24. A plastic material comprising clay thoroughly and uniformly impregnated with bituminous matter but having its ultimate particles in substantially their original mutual relation and possessing their original properties; said plastic material being dense, hard, malleable, changing but little with temperature changes and being substantially free of pores and voids.

25. A plastic material comprising clay thoroughly and uniformly impregnated with asphalt but having its ultimate particles in substantially their original mutual relation and possessing their original properties; said plastic material being dense, hard, malleable, changing but little with temperature changes and being substantially free of pores and voids.

26. A plastic material comprising natural soil thoroughly and uniformly impregnated with asphalt but having the ultimate particles in substantially their original mutual relation and possessing their original properties; said composition being dense, hard, malleable, changing but little with temperature changes and being substantially free of pores and voids.

27. A plastic material comprising clay thoroughly and uniformly impregnated with bituminous matter solid or semi-solid at ordinary temperatures and having the ultimate clay particles in substantially their original mutual relation and possessing their original properties; said plastic material being dense, hard, malleable, changing but little with temperature changes and being substantially free of pores and voids.

In testimony whereof I have hereunto set my hand.

MICHAEL A. POPKESS.